US012659612B2

(12) United States Patent
Choi et al.

(10) Patent No.: US 12,659,612 B2
(45) Date of Patent: Jun. 16, 2026

(54) IMAGE SENSOR FOR REDUCING NOISE

(71) Applicant: SAMSUNG ELECTRONICS CO., LTD., Suwon-si (KR)

(72) Inventors: Yongsuk Choi, Suwon-si (KR); Younghyun Yoon, Suwon-si (KR); Haneul Jung, Suwon-si (KR); Dongjae Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 281 days.

(21) Appl. No.: 18/325,507

(22) Filed: May 30, 2023

(65) Prior Publication Data

US 2024/0147089 A1     May 2, 2024

(30) Foreign Application Priority Data

Nov. 1, 2022     (KR) ........................ 10-2022-0143955

(51) Int. Cl.
| | |
|---|---|
| *H04N 25/60* | (2023.01) |
| *H04N 25/616* | (2023.01) |
| *H04N 25/772* | (2023.01) |
| *H04N 25/78* | (2023.01) |

(52) U.S. Cl.
CPC ........... *H04N 25/60* (2023.01); *H04N 25/616* (2023.01); *H04N 25/772* (2023.01); *H04N 25/78* (2023.01)

(58) Field of Classification Search
CPC .... H04N 25/60; H04N 25/616; H04N 25/772; H04N 25/78
See application file for complete search history.

(56) References Cited

U.S. PATENT DOCUMENTS

| | | |
|---|---|---|
| 8,421,893 B2 | 4/2013 | Kurihara et al. |
| 9,628,728 B2 | 4/2017 | Hwang |
| 10,348,323 B2 | 7/2019 | Xhakoni et al. |
| 10,805,568 B2 | 10/2020 | Kim |
| 10,969,273 B2 | 4/2021 | Berkovich et al. |
| 11,258,977 B2 * | 2/2022 | Lule ...................... H04N 25/59 |
| 2020/0204751 A1 * | 6/2020 | Lule .................... H04N 25/771 |
| 2022/0038651 A1 | 2/2022 | Kang et al. |

FOREIGN PATENT DOCUMENTS

| | | |
|---|---|---|
| JP | 2012010055 | 1/2012 |
| KR | 10-2016-0131503 | 11/2016 |
| KR | 10-2020-0013497 | 2/2020 |
| KR | 10-2022-0016414 | 2/2022 |

* cited by examiner

*Primary Examiner* — Nicholas G Giles
(74) *Attorney, Agent, or Firm* — Morgan, Lewis & Bockius LLP

(57)     ABSTRACT

An image sensor includes a pixel array connected to a plurality of column lines, a first ramp signal generator generating a first ramp signal, a second ramp signal generator generating a second ramp signal, and an analog-to-digital conversion (ADC) circuit operating in a first mode. The ADC circuit includes a first comparator group comparing the first ramp signal with a first pixel signal received from a first column line group, among the plurality of column lines, and a second comparator group comparing the second ramp signal with a second pixel signal received from a second column line group, among the plurality of column lines. The comparing of the first ramp signal occurs at a comparison time point different from a comparison time point during which the comparing of the second ramp signal occurs.

16 Claims, 16 Drawing Sheets

| * HNR mode | CDS1 (RMP1) | CDS2 (RMP2) | CDS1 (RMP1) | CDS2 (RMP2) |
|---|---|---|---|---|
| 1h-time | Gr1 | Gr2 | R1 | R2 |
| 2h-time | B1 | B2 | Gr1 | Gr2 |
| 3h-time | Gr1 | Gr2 | R1 | R2 |
| 4h-time | B1 | B2 | Gb1 | Gb2 |

FIG.  9C

| *DSG mode | CDS1 (RMP1) | CDS2 (RMP2) | CDS1 (RMP1) | CDS2 (RMP2) |
|---|---|---|---|---|
| 1h-time | Gr1 | | Gr2 | |
| 2h-time | R1 | | R2 | |
| 3h-time | B1 | | B2 | |
| 4h-time | Gb1 | | Gb2 | |

IMAGE SENSOR FOR REDUCING NOISE

CROSS-REFERENCE TO RELATED APPLICATION

This U.S. patent application is based on and claims priority under 35 U.S.C. § 119 to Korean Patent Application No. 10-2022-0143955, filed on Nov. 1, 2022, in the Korean Intellectual Property Office, the disclosure of which is incorporated by reference in its entirety herein.

1. TECHNICAL FIELD

The inventive concept relates to an image sensor, and more particularly, to an image sensor for reducing noise.

2. DISCUSSION OF RELATED ART

Image sensors are capable of capturing a two-dimensional (2D) or a three-dimensional (3D) image of an object. The image sensors may generate an image of the object using a photoelectric transformation element that reacts according to an intensity of light reflected from the object. With the recent development of complementary metal-oxide semi-conductor (CMOS) technology, CMOS image sensors using CMOS have been widely used.

Each of the image sensors may include a pixel array having a plurality of pixels, where each of the pixels includes the photoelectric transformation element. However, noise may be introduced when the image sensors read one row line of the pixel array at the same time to cause performance and image performance to deteriorate. Thus, there is a need for an image sensor capable of operating with reduced noise.

SUMMARY

At least one embodiment of the inventive concept pro-vides an image sensor capable of reducing noise by varying time points at which pixel signals are compared for the same row line using a plurality of ramp signal generators.

According to an aspect of the inventive concept, there is provided an image sensor including a pixel array, a first ramp signal generator, a second ramp signal generator, and an analog-to-digital conversion (ADC) circuit. The pixel array is connected to a plurality of column lines. The first ramp signal generator is for generating a first ramp signal. The second ramp signal generator is for generating a second ramp signal. The analog-to-digital conversion (ADC) circuit operates in a first mode. The ADC circuit includes a first comparator group and a second comparator group. The first comparator group is for comparing the first ramp signal with a first pixel signal received from a first column line group, among the plurality of column lines. The second comparator group is for comparing the second ramp signal with a second pixel signal received from a second column line group, among the plurality of column lines. The comparing of the first ramp signal occurs at a comparison time point different from a comparison time point during which the comparing of the second ramp signal occurs.

According to another aspect of the inventive concept, there is provided an image sensor including a pixel array, a first ramp signal generator, a second ramp signal generator, an analog-to-digital conversion (ADC) circuit, and a timing controller. The pixel array includes a plurality of pixels. The pixel array is connected to a plurality of column lines outputting a plurality of pixel signals generated by the plurality of pixels. The first ramp signal generator is for generating a first ramp signal. The second ramp signal generator is for generating a second ramp signal. The analog-to-digital conversion (ADC) circuit analog-to-digital is for converting the plurality of pixel signals and operates in a first mode. The timing controller controls timings of the first ramp signal generator and the second ramp signal generator. The ADC circuit includes a first correlated double sampling (CDS) circuit and a second CDS circuit. The first CDS circuit is for reading the plurality of pixel signals based on the first ramp signal. The second CDS circuit is for reading the plurality of pixel signals based on the second ramp signal in the first mode. The plurality of pixel signals include a plurality of first pixel signals and a plurality of second pixel signals. The plurality of column lines include a plurality of first column lines and a plurality of second column lines. The first CDS circuit reads the plurality of pixel signals at a timing different from a timing at which the second CDS circuit reads the plurality of pixel signals.

According to another aspect of the inventive concept, there is provided an image sensor including a first ramp signal generator, a second ramp signal generator, a pixel array, and an analog-to-digital conversion (ADC) circuit. The first ramp signal generator is for generating a first ramp signal. The second ramp signal generator is for generating a second ramp signal. The pixel array includes first color pixels connected to a first column line and a second column line and second color pixels connected to a third column line and a fourth column line. The ADC circuit includes a first comparator and a second comparator. The first comparator is for comparing a first pixel signal received from the first column line and the third column line with the first ramp signal. The second comparator is for comparing a second pixel signal received from the second column line and the fourth column line with the second ramp signal. The com-paring of the first pixel signal occurs at a comparison time point different from a comparison time point during which the comparing of the second pixel signal occurs.

BRIEF DESCRIPTION OF THE DRAWINGS

Embodiments will be more clearly understood from the following detailed description taken in conjunction with the accompanying drawings in which:

FIGS. 4A and 4B are views illustrating arrangements of pixels of an image sensor according to an embodiment, and show a tetra pattern;

FIGS. 9B and 9C are tables illustrating operations accord-ing to modes of an image sensor according to embodiments;

DETAILED DESCRIPTION OF THE EMBODIMENTS

Figure 1:
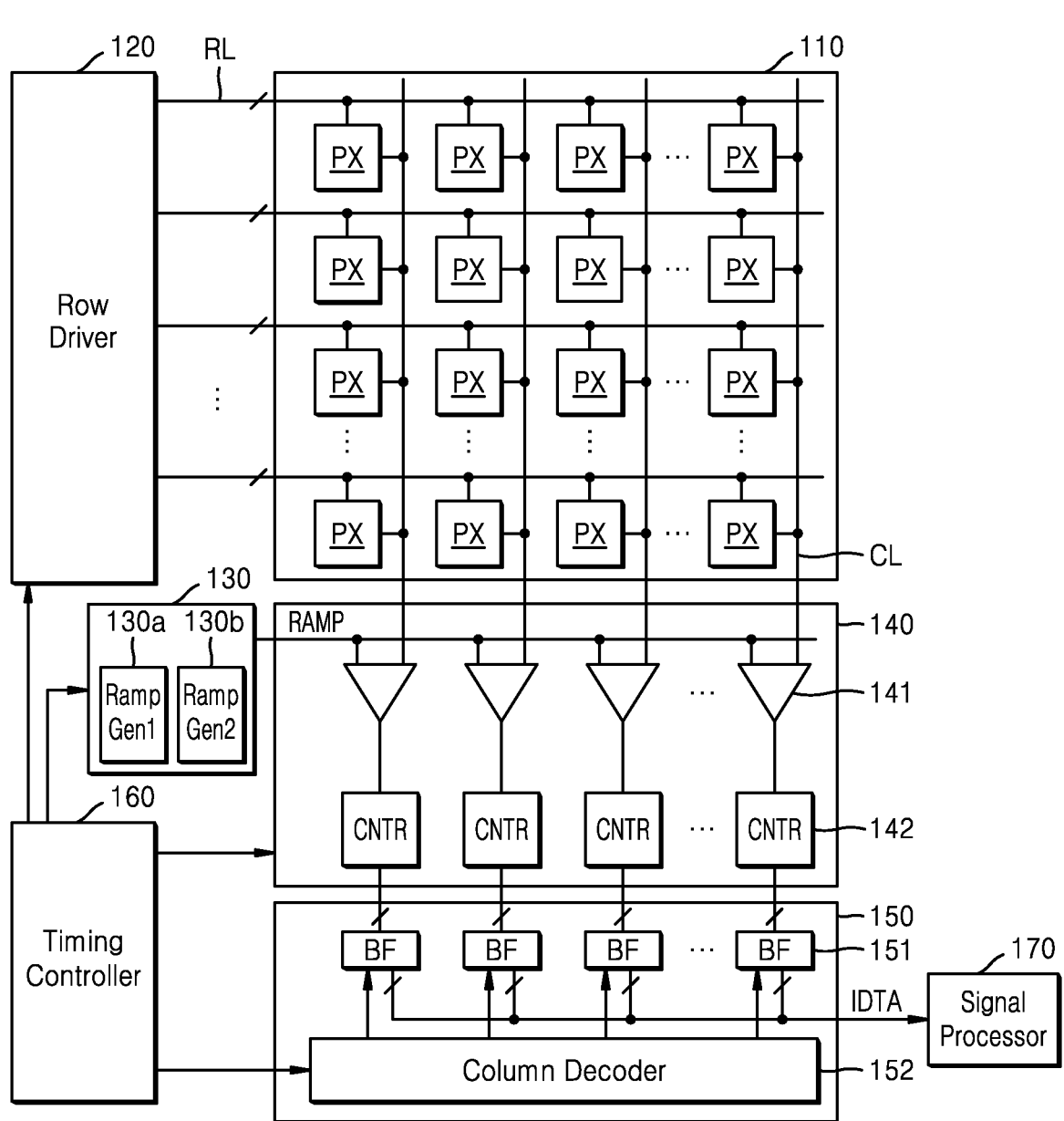
FIG. 1 is a block diagram illustrating a configuration of an image sensor according to an embodiment.

FIG. 1 is a block diagram illustrating a configuration of an image sensor 100 according to an embodiment.

The image sensor 100 may be mounted in an electronic device having an image or light sensing function. For example, the image sensor 100 may be mounted in electronic devices, such as cameras, smartphones, wearable devices, the Internet of things (IoT), tablet personal computers (PCs), personal digital assistants (PDAs), portable multimedia players (PMPs), and navigation devices. In addition, the image sensor 100 may be mounted on electronic devices provided as parts, such as vehicles, furniture, manufacturing facilities, doors, and various measurement devices.

The image sensor 100 may include a pixel array 110, a row driver 120 (e.g., a driver circuit), a ramp signal generator (or a ramp generator) 130, an analog-to-digital conversion (ADC) circuit 140 (e.g., an analog-to-digital converter), a data output circuit 150, and a timing controller 160 (e.g., a control circuit). The image sensor 100 may further include a signal processor 170.

The pixel array 110 includes a plurality of pixels PX connected to a plurality of row lines RL and a plurality of column lines CL and arranged in rows and columns.

Each of the pixels PX may include at least one photoelectric transformation element, and the pixel PX may sense light using the photoelectric transformation element and output an image signal that is an electrical signal according to the detected light. For example, the photoelectric transformation element may include a photodiode, a phototransistor, a photogate, or a pinned photodiode. For example, the sensed light may be received from an object or reflected from the object.

Each of the pixels PX may sense light in a certain spectral range. For example, the pixels PX may include a red pixel converting light in a red spectral range into an electrical signal, a green pixel converting light in a green spectral range into an electrical signal, and a blue pixel converting light in a blue spectral range into an electrical signal. However, the inventive concept is not limited thereto. For example, the pixels PX may further include white pixels. As another example, the pixels PX may include pixels combined in different color configurations, for example, yellow pixels, cyan pixels, and green pixels.

A color filter array allowing light in a certain spectral range to be transmitted therethrough may be disposed above the pixels PX, and colors that the corresponding pixels may detect may be determined according to the color filters disposed above the pixels, respectively. However, the inventive concept is not limited thereto. In an embodiment, a certain photoelectric transformation element may transform light of a certain wavelength band to an electrical signal according to a level of an electric signal applied thereto.

The row driver 120 drives the pixel array 110 in units of rows. The row driver 120 may decode a row control signal (e.g., an address signal) received from the timing controller 160 and select at least one of the row lines constituting the pixel array 110 in response to the decoded row control signal. For example, the row driver 120 may generate a selection signal for selecting one of the row lines that corresponds to the address signal. Also, the pixel array 110 outputs a pixel signal, for example, a pixel voltage, from the row line selected by the selection signal provided from the row driver 120. The pixel signal may include a reset signal and an image signal.

The row driver 120 may transmit control signals for outputting pixel signals to the pixel array 110, and the pixels PX may operate in response to the control signals to output pixel signals.

In an embodiment, the ramp signal generator 130 generates a ramp signal RAMP having a level rising or falling with a certain slope under the control of the timing controller 160. The ramp signal generator 130 may include a first ramp signal generator 130a that generates a first ramp signal (e.g., RAMP1 in FIG. 2) and a second ramp signal generator 130b that generates a second ramp signal (e.g., RAMP2 in FIG. 2). The first ramp signal RAMP1 and the second ramp signal RAMP2 may be respectively provided to a plurality of comparators 141 (e.g., comparator circuits) provided in the ADC circuit 140. In an embodiment, a slope of the first ramp signal RAMP1 is the same as a slope of the second ramp signal RAMP2. Hereinafter, description is given mainly with reference to the fact that the slope of the first ramp signal RAMP1 is the same as the slope of the second ramp signal RAMP2, but embodiments are not limited thereto. For example, when the image sensor 100 operates in a certain mode, the ramp signal generator 130 may generate the first ramp signal RAMP1 and the second ramp signal RAMP2 such that the slopes of the first ramp signal RAMP1 and the second ramp signal RAMP2 are different from each other.

The ADC circuit 140 may include a plurality of comparators 141 and a plurality of counter (CNTR) circuits 142. The ADC circuit 140 may convert a pixel signal (e.g., a pixel voltage) input from the pixel array 110 into a pixel value that is a digital signal. The pixel signals respectively received through the column lines CL are converted into pixel values that are digital signals by the comparators 141 and the counter circuits 142.

The comparators 141 may compare the pixel signals received through the column lines CL, for example, pixel voltages, with the first ramp signal RAMP1 or the second ramp signal RAMP2 to generate a comparison result as a comparison result signal for output. In an embodiment, when the level of the first ramp signal RAMP1 or the second ramp signal RAMP2 is equal to the level of the pixel signal, the comparators 141 output a comparison signal transitioning from a first level (e.g., logic high) to a second level (e.g., logic low) different from the first level. A time point at which the level of the comparison signal transitions may be determined according to the level of the pixel signal. In an embodiment, a time point at which the level of the comparison signal transitions when comparing the pixel voltage with the first ramp signal RAMP1 may be different from a time point at which the level of the comparison signal transitions when comparing the pixel voltage with the second ramp signal RAMP2. Some embodiments are described below with reference to FIGS. 5 to 7.

The comparators 141 may be a plurality of correlated double sampling (CDS) circuits. A CDS circuit may sample a pixel signal provided from the pixel PX according to a CDS method. The CDS circuit may sample a reset signal received as a pixel signal and compare the reset signal with the first ramp signal RAMP1 or the second ramp signal RAMP2 to generate a comparison signal in accordance with the reset signal. The CDS circuit may store the reset signal.

Thereafter, the CDS circuit may sample an image signal correlated with the reset signal and compare the image signal with the first ramp signal RAMP1 or the second ramp signal RAMP2 to generate a comparison signal in accordance with the image signal. In an embodiment, the CDS circuit includes two comparators. For example, the two comparators may be implemented by an operational transconductance amplifier (OTA) (or a differential amplifier). Some embodiments are described below with reference to FIG. 10.

The counter circuit 142 may count a level transition time point of a comparison result signal output from the comparators 141 to generate a count value and output the count value. In an embodiment, the counter circuit 142 includes a latch circuit and an arithmetic circuit.

The data output circuit 150 may temporarily store the pixel value output from the ADC circuit 140 and then output the pixel value. The data output circuit 150 may include a plurality of column memories (BF) 151 and a column decoder 152 (e.g., a decoder circuit). The column memory 151 stores the pixel value received from the counter circuit 142. In an embodiment, each of the column memories 151 may be provided in the counter circuit 142. The pixel values respectively stored in the column memories 151 may be output as image data IDTA under control by the column decoder 152.

The timing controller 160 may output a control signal to each of the row driver 120, the ramp signal generator 130, the ADC circuit 140, and the data output circuit 150 to control an operation or timing of the row driver 120, the ramp signal generator 130, the ADC circuit 140, and the data output circuit 150. In an embodiment, a control signal transmitted from the timing controller 160 to the first ramp signal generator 130a is different from a control signal transmitted from the timing controller 160 to the second ramp signal generator 130b, so that the operation or timing of the first ramp signal generator 130a is different from that of the second ramp signal generator 130b.

The signal processor 170 may perform noise reduction processing, gain adjustment, waveform shaping processing, interpolation processing, white balance processing, gamma processing, edge enhancement processing, and binning on the image data IDTA. In an embodiment, the signal processor 170 may also be located in an external processor of the image sensor 100. In an embodiment, the signal processor 170 generates a final digital signal based on a plurality of digital signals. As an example, the signal processor 170 may perform an average operation on binary values of the digital signals to calculate an average value of the digital signals as a final digital signal.

Figure 2:
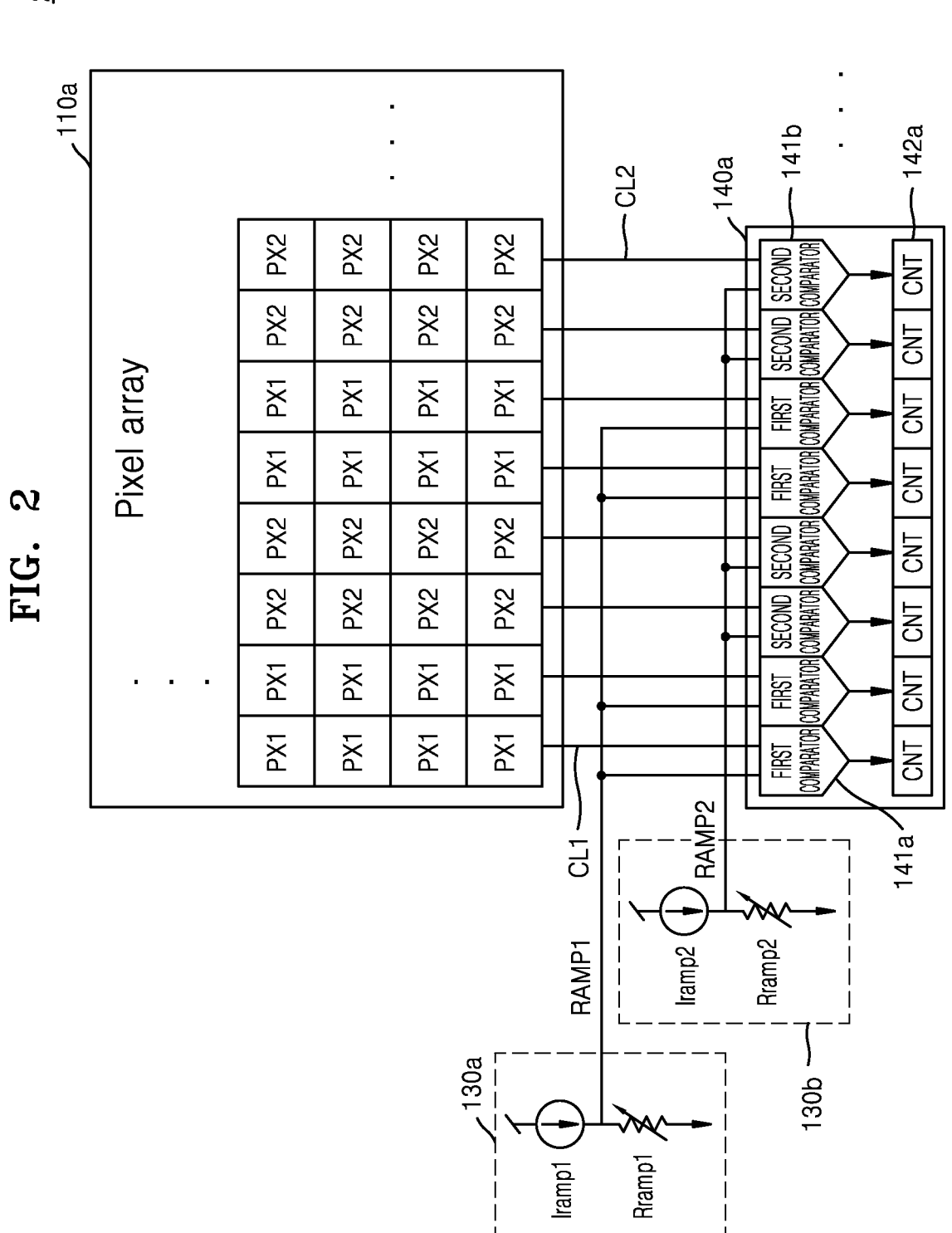
FIG. 2 is a block diagram illustrating an implementation of an image sensor according to an embodiment.

FIG. 2 is a block diagram illustrating an implementation of an image sensor 200 according to an embodiment. In some embodiments, the image sensor 200 of FIG. 2 may be an example of the image sensor 100 of FIG. 1. Referring to FIG. 2, the image sensor 200 may include a pixel array 110a, a first ramp signal generator 130a, a second ramp signal generator 130b, and an ADC circuit 140a.

The pixel array 110a may include a plurality of pixels PX and may be connected to a plurality of column lines CL outputting a plurality of pixel signals generated by the pixels PX. In some embodiments, a pixel group of the same color may be divided into two pixel groups PX1 or PX2 and may be connected to two column line groups CL1 or CL2. For example, the pixels PX may include first color pixels and second color pixels. The first pixel group PX1 may include some of the first color pixels and some of the second color pixels, and the second pixel group PX2 may include the other first color pixels and the other second color pixels. The column lines may include a first column line group CL1 and a second column line group CL2, and the first column line group CL1 may output a first pixel signal from the first pixel group PX1 and the second column line group CL2 may output a second pixel signal from the second pixel group PX2.

The first ramp signal generator 130a may include a first current source Iramp 1 and first variable resistor Rramp1. The second ramp signal generator 130b may include a second current source Iramp2 and a second variable resistor Rramp2. The variable resistor Rramp1 and Rramp2 may be implemented by a potentiometer as an example. The first ramp signal generator 130a may generate a ramp voltage (e.g., a first ramp voltage Vramp1 in FIG. 6) having a level that rises or falls with a certain slope. The second ramp signal generator 130b may generate a ramp voltage (e.g., a second ramp voltage Vramp2 in FIG. 6) having a level that rises or falls with a certain slope. The first ramp voltage Vramp1 may be provided as the first ramp signal RAMP1 to the first comparator group 141a, and the second ramp voltage Vramp2 may be provided as the second ramp signal RAMP2 to the second comparator group 141b. In an embodiment, the slope of the first ramp voltage Vramp1 generated by the first ramp signal generator 130a is the same as the slope of the second ramp voltage Vramp2 generated by the second ramp signal generator 130b.

The ADC circuit 140a may include the first comparator group 141a, the second comparator group 141b, and a counter circuit 142a. In an embodiment, the first comparator group 141a receives the first ramp voltage Vramp1 generated by the first ramp signal generator 130a and the first pixel signal output by the first column line group CL1, and compares the first ramp voltage Vramp1 with the first pixel signal to generate a comparison signal. The second comparator group 141b may receive the second ramp voltage Vramp2 generated by the second ramp signal generator 130b and the second pixel signal output from the second column line group CL2, and compare the second ramp voltage Vramp2 with the second pixel signal to generate a comparison signal.

Referring further to FIGS. 1 and 2, a control signal transmitted from the timing controller 160 to the first ramp signal generator 130a may be different from a control signal transmitted from the timing controller 160 to the second ramp signal generator 130b, and a time point at which the level of the first ramp voltage Vramp1 changes may be different from a time point at which the level of the second ramp voltage Vramp2 changes, so that a comparison time point of the first comparator group 141a may be different from a comparison time point of the second comparator group 141b. When the comparison time point of the first comparator group 141a is different from the comparison time point of the second comparator group 141b, introduction of the same noise may be prevented and noise may be canceled with each other, thereby reducing noise of the image sensor 100. Examples of the time point at which the level of the first ramp voltage Vramp1 changes and the time point at which the level of the second ramp voltage Vramp2 changes is described below with reference to FIGS. 5 to 7.

The counter circuit 142a may be the same as the counter circuit 142 of FIG. 1 described above. In an embodiment, a level transition time point of the comparison result signal output from the first comparator group 141a or the second comparator group 141b is counted to generate a count value and the count value may be output.

Figure 3:
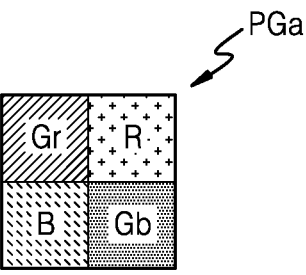
FIG. 3 is a view illustrating an arrangement of pixels of an image sensor according to an embodiment, and shows a Bayer pattern.

FIG. 3 is a view illustrating arrangement of pixels of an image sensor according to an embodiment and shows a Bayer pattern. In some embodiments, a pixel group PGa of FIG. 3 may be an example of the pixels PX of FIG. 2. The pixel group PGa may be repeatedly disposed in the pixel array 110a of FIG. 2. The Bayer pattern may refer to a pattern in which green that is 50% and red and blue that are each 25% are alternately disposed according to human visual characteristics. For example, 25% of the Bayer pattern may correspond to red pixel(s), 25% of the Bayer pattern may correspond to blue pixel(s), and 50% of the Bayer pattern may correspond to green pixel(s).

The pixel group PGa may be configured in a 2×2 Bayer pattern. For example, the pixel group PGa may include a first green pixel Gr, a red pixel R, a second green pixel Gb, and a blue pixel B, wherein the first green pixel Gr and the second green pixel Gb may be located in a diagonal direction, and the red pixel R and the blue pixel B may be located in a diagonal direction. In some embodiments, the pixel group PGa may be configured in a 4×4 Bayer pattern. For example, the pixel group PGa may include four first green pixels Gr, four red pixels R, four second green pixels Gb, and four blue pixels B. In addition to this, the pixel groups may be configured in Bayer patterns of various sizes.

Referring further to FIGS. 2 and 3, in some embodiments, pixels of the same color may be divided into two groups to transfer a pixel signal to the first comparator group 141a or the second comparator group 141b. For example, the first green pixels Gr and the red pixels R may be arranged on the same row line, and some of the first green pixels Gr and some of the red pixels R may be included in the first pixel group PX1, and the other pixels among the first green pixels Gr and the other pixels among the red pixels R may be included in the second pixel group PX2. The second green pixels Gb and the blue pixels B may be arranged on the same row line some of the second green pixels Gb and some of the blue pixels B may be included in the first pixel group PX1, the other pixels among the second green pixels Gb and the other pixels among the blue pixels B may be included in the second pixel group PX2. The first column line group CL1 may output first pixel signals from the first pixel group PX1, and the second column line group CL2 may output second pixel signals from the second pixel group PX2.

Figure 4A:
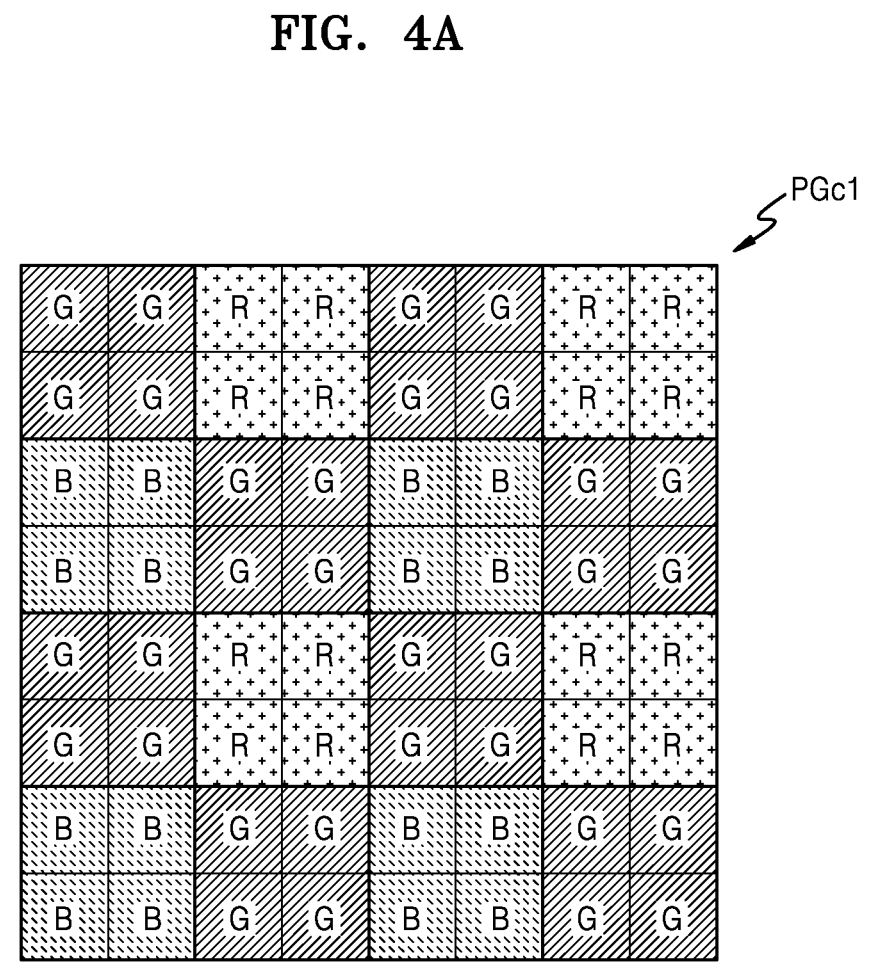
Figure 4B:
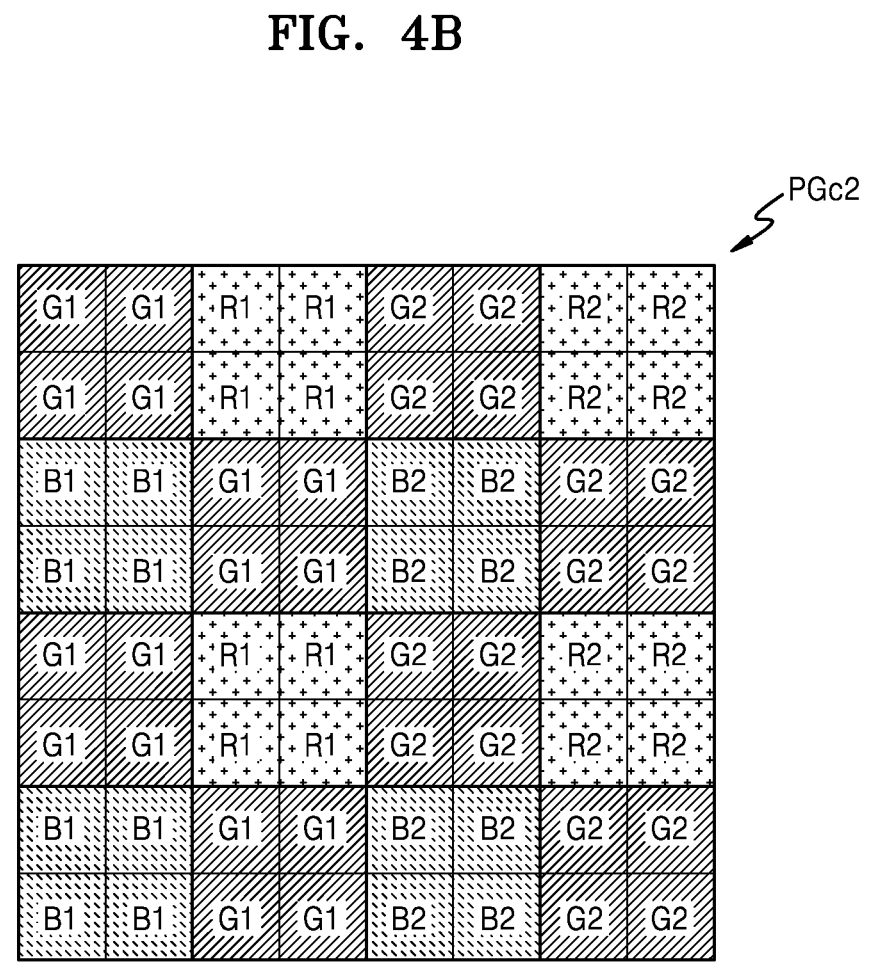

FIGS. 4A and 4B are diagrams illustrating arrangements of pixels of an image sensor according to an embodiment, and show a tetra pattern. In some embodiments, a pixel group PGc1 of FIG. 4A or a pixel group PGc2 of FIG. 4B may be an example of the pixels PX of FIG. 2. The pixel group PGc1 or PGc2 may be repeatedly arranged in the pixel array 110a of FIG. 2.

The pixel group PGc1 or PGc2 may include red pixels R arranged in a 2×2 matrix, blue pixels B arranged in a 2×2 matrix, and green pixels G arranged in a 2×2 matrix, and the arrangement of these pixels may be referred to as a tetra pattern. However, the inventive concept is not limited thereto, and the pixel group PGc1 or PGc2 may include red pixels R arranged in an n×n matrix (n is an integer greater than or equal to 3), blue pixels B arranged in an n×n matrix, and green pixels G arranged in an n×n matrix.

Referring further to FIGS. 2, 4A, and 4B, in some embodiments, pixels of the same color may be divided into two groups, and each of the two groups may transfer pixel signals to a corresponding comparator group, among the first comparator group 141a and the second comparator group 141b. For example, the green pixels G and red pixels R may be arranged on the same row line, and some (e.g., G1) of the green pixels and some (e.g., R1) of the red pixels R may be included in the first pixel group PX1, and the other pixels (e.g., G2) among the green pixels G and the other pixels (e.g., R2) among the red pixels R may be included in the second pixel group PX2. The green pixels G and the blue pixels B may be arranged on the same row line, some (e.g., G1) of the green pixels G and some (e.g., B1) of the blue pixels may be included in the first pixel group PX1, and the other pixels (e.g., G2) among the green pixels G and the other pixels (e.g., B2) among the blue pixels B may be included in the second pixel group PX2, the first column line group CL1 may output first pixel signals from the first pixel group PX1, and the second column line group CL2 may output second pixel signals from the second pixel group PX2.

Figure 5:
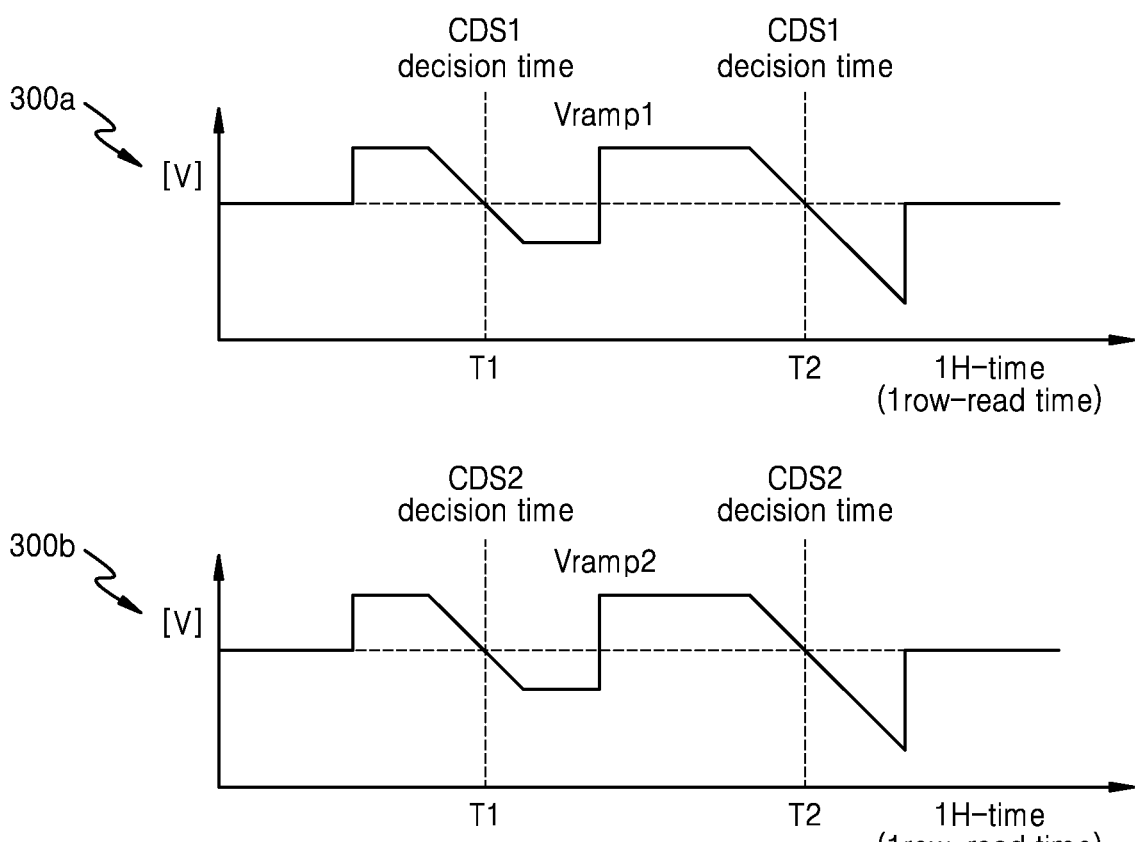
FIG. 5 shows graphs illustrating a point in time at which a comparator compares a ramp signal with a pixel signal according to a comparative example of the inventive con-cept.

FIG. 5 is a graph illustrating a time point at which a comparator according to a comparative example of the inventive concept compares a ramp signal with a pixel signal. Referring further to FIG. 2, a case in which the ramp voltage Vramp1 generated by the first ramp signal generator 130a is equal to the ramp voltage Vramp2 generated by the second ramp signal generator 130b is illustrated. Graph 300a may show that the first comparator group 141a compares the first pixel signal with the ramp voltage Vramp1, and graph 300b shows that the second comparator group 141b compares the second pixel signal with the ramp voltage Vramp2.

The first comparator group 141a may sample a first reset signal received as a first pixel signal from the first pixel group PX1 through the first column line group CL1, and compare the first reset signal with the ramp voltage Vramp1 at time point T1 to generate a comparison signal according to the first reset signal. The second comparator group 141b may sample a second reset signal received as a second pixel signal from the second pixel group through the second column line group CL2, and compare the second reset signal with the ramp voltage Vramp2 at time point T1 to generate a comparison signal according to the second reset signal. The first comparator group 141a may store the first reset signal. The second comparator group 141b may store the second reset signal. The first comparator group 141a may sample a first image signal correlated with the first reset signal, and compare the first image signal with the ramp voltage Vramp1 at time point T2 to generate a comparison signal in accordance with the first image signal. The second comparator group 141b may sample a second image signal correlated with the second reset signal, and compare the second image signal with the ramp voltage Vramp2 at time point T2 to generate a comparison signal in accordance with the second image signal.

When the ramp voltage Vramp1 generated by the first ramp signal generator 130a is equal to the ramp voltage Vramp2 generated by the second ramp signal generator 130b, the first comparator group 141a and the second comparator group 141b may generate the comparison signal at the same time point (T1 or T2), and the same noise may be introduced and reinforce each other, so the noise may be amplified and performance of the image sensor may be degraded due to the amplified noise.

Figure 6:
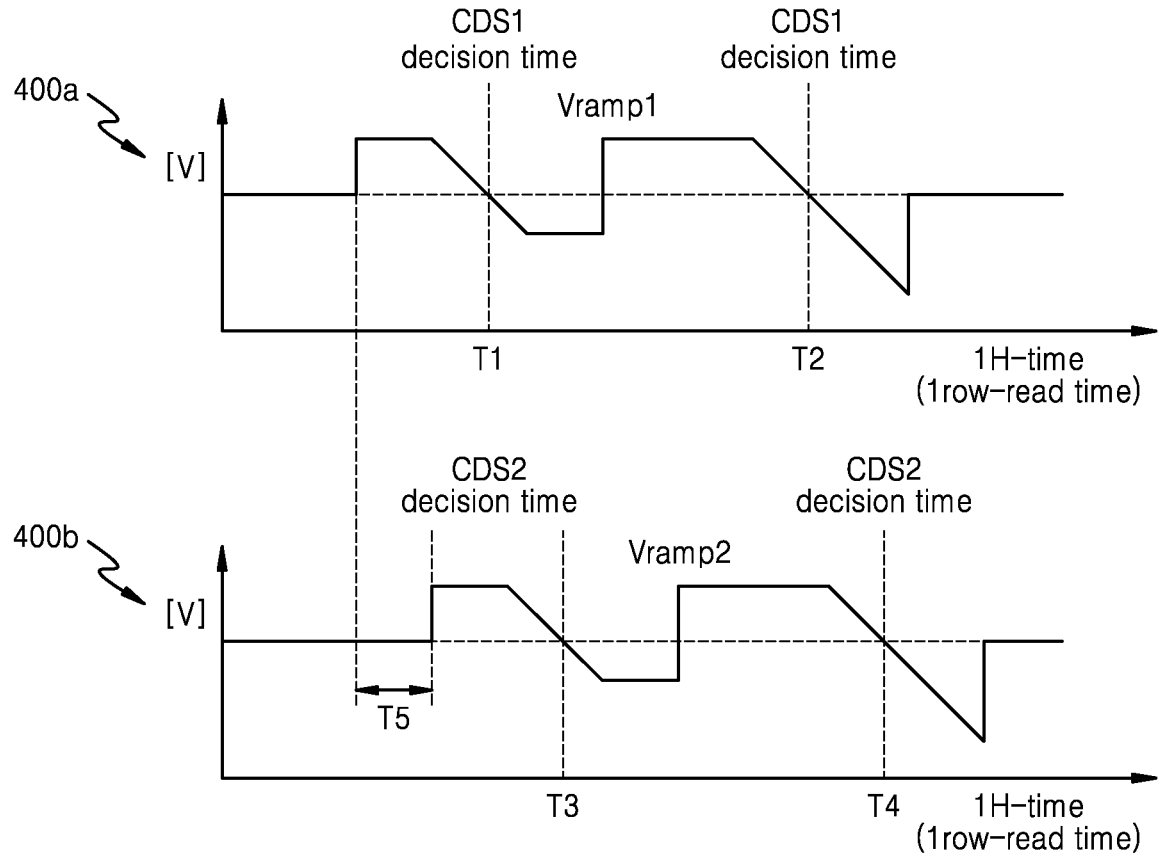
FIGS. 6 and 7 are graphs illustrating a time point at which a comparator compares a ramp signal with a pixel signal according to an embodiment.
Figure 7:
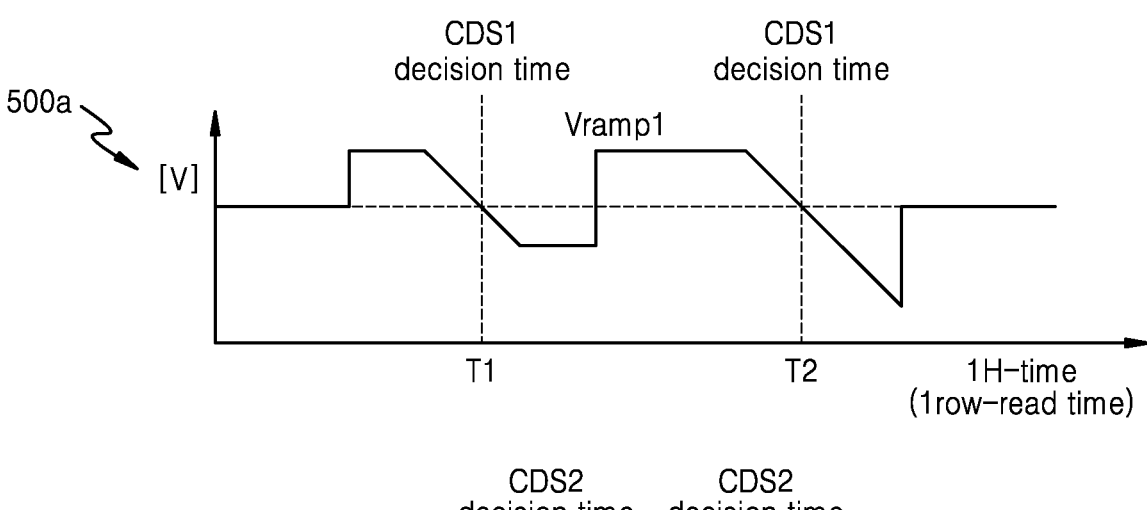
Figure 7:
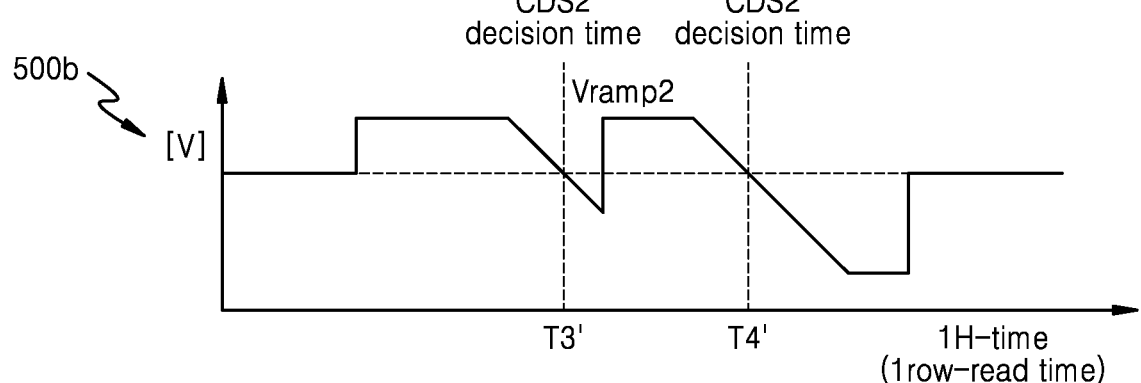

FIGS. 6 and 7 are graphs illustrating a time point at which a comparator according to an embodiment compares a ramp signal with a pixel signal. Referring further to FIG. 2, a case in which a time point at which the level of the ramp voltage Vramp1 generated by the first ramp signal generator 130a changes is different from a time point at which the level of the ramp voltage Vramp2 generated by the second ramp signal generator 130b changes is illustrated. A graph 400a or 500a may show that the first comparator group 141a compares the first pixel signal with the ramp voltage Vramp1, and a graph 400b or 500b may show that the second comparator group 141b compares the second pixel signal with the ramp voltage Vramp1.

In an embodiment, the first comparator group 141a and the second comparator group 141b may be CDS circuits. The CDS circuit may sample a pixel signal provided from the pixel group PX1 or PX2 according to a CDS method.

Referring to FIGS. 1, 2, and 6, in an embodiment, a control signal transmitted from the timing controller 160 to the first ramp signal generator 130a is different from a control signal transmitted from the timing controller 160 to the second ramp signal generator 130b, the ramp voltage Vramp1 generated by the first ramp signal generator 130a has the same slope as that of the ramp voltage Vramp2 generated by the second ramp signal generator 130b, and a time point at which the level of the ramp voltage Vramp1 transitions is different from a time point at which the level of the ramp voltage Vramp2 transitions by T5. The first comparator group 141a may sample the first reset signal received as the first pixel signal from the first pixel group PX1 through the first column line group CL1 and compare the first reset signal with the ramp voltage Vramp1 at the time point T1 to generate a comparison signal in accordance with the first reset signal, and the second comparator group 141b may sample the second reset signal received as the second pixel signal from the second pixel group PX2 through the second column line group CL2 and compare the second reset signal with the ramp voltage Vramp2 at time point T3 later by T5 than time point T1. The first comparator group 141a may store a first reset signal. The second comparator group 141b may store a second reset signal. Thereafter, the first comparator group 141a may sample the first image signal correlated with the first reset signal and compare the first image signal with the ramp voltage Vramp1 at time point T2 to generate a comparison signal in accordance with the first image signal, and the second comparator group 141b may sample the second image signal correlated with the second reset signal and compare the second image signal with the ramp voltage Vramp2 at time point T4 later by T5 than time point T1 to generate a comparison signal in accordance with the second image signal.

Referring to FIGS. 1, 2, and 7, a control signal transmitted from the timing controller 160 to the first ramp signal generator 130a is different from a control signal transmitted from the timing controller 160 to the second ramp signal generator 130b, the slope at which the level of the ramp voltage Vramp1 generated by the first ramp signal generator 130a falls is the same as the slope at which the level of the ramp voltage Vramp2 generated by the second ramp signal generator 130b falls, and time points at which the levels fall are different from each other. The first comparator group 141a may sample the first reset signal received as the first pixel signal from the first pixel group PX1 through the first column line group CL1 and compare the first reset signal with the ramp voltage Vramp1 at the time point T1 to generate a comparison signal in accordance with the first reset signal. The second comparator group 141b may sample the second reset signal received as the second pixel signal from the second pixel group PX2 through the second column line group CL2 and compare the second reset signal with the ramp voltage Vramp2 at time point T3' later than time point T1. The first comparator group 141a or the second comparator group 141b may store a first reset signal or a second reset signal. Thereafter, the first comparator group 141a may sample the first image signal correlated with the first reset signal and compare the first image signal with the ramp voltage Vramp1 at time point T2 to generate a comparison signal in accordance with the first image signal. The second comparator group 141b may sample the second image signal correlated with the second reset signal and compare the second image signal with the ramp voltage Vramp2 at time point T4' earlier than time point T2 to generate a comparison signal in accordance with the second image signal. However, the embodiments are not limited thereto, and time point T1 may be different from time point T3', and time point T2 may be different from time point T4'. For example, time point T3' may occur earlier than time point T1, and time point T2 may occur earlier than time point T4'.

Referring to FIGS. 6 and 7, when a time point at which the level of the ramp voltage Vramp1 generated by the first ramp signal generator 130a changes is different from a time point at which the level of the ramp voltage Vramp2 generated by the second ramp signal generator 130b changes, a time point at which the first comparator group 141a generates the comparison signal in accordance with the pixel signal may be different from a time point at which the second comparator group 141b generates the comparison signal in accordance with the pixel signal. That is, because time point T1 may be different from time point T3 (or time point T3') and time point T2 may be different from time point T4 (or time point T4'), the same noise may be prevented from being introduced and noise may be canceled out with each other, thereby improving the performance of the image sensor.

Figure 8:
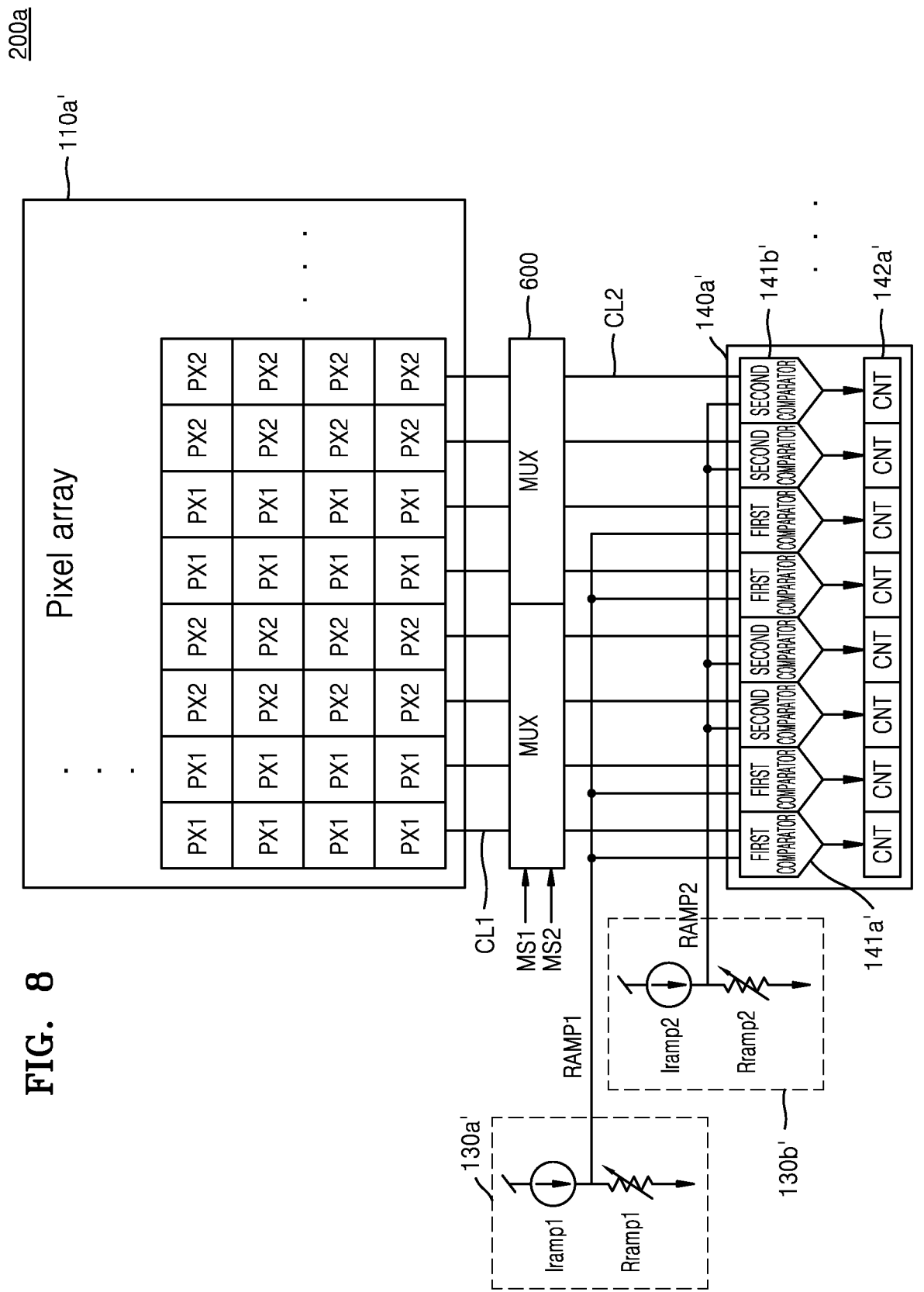
FIG. 8 is a block diagram illustrating an implementation example of an image sensor according to an embodiment.

FIG. 8 is a block diagram illustrating an implementation example of an image sensor 200a according to an embodiment. In some embodiments, the image sensor 200a of FIG. 8 may be an example of the image sensor 200 of FIG. 2. Referring to FIG. 8, the image sensor 200a may include a pixel array 110a', a first ramp signal generator 130a', a second ramp signal generator 130b', an ADC circuit 140a', and a multiplexer 600.

The pixel array 110a' may be an example of the pixel array 110a of FIG. 2 described above. For example, the first pixel group PX1 may include pixels arranged in a (4n+1)-th (n is an integer greater than or equal to 0) column and a (4n+2)-th column, and the second pixel group PX2 may include pixels arranged in a (4n+3)-th column and a (4n+4)-th column. The pixels of the first pixel group PX1 may be connected to a (4n+1)-th (n is an integer greater than or equal to 0) column line and a (4n+2)-th column line, and the second pixel group PX2 may be connected to a (4n+3)-th column line and a (4n+4)-th column line.

The first ramp signal generator 130a' may be the same as the first ramp signal generator 130a of FIG. 2 described above, the second ramp signal generator 130b' may be the same as the second ramp signal generator 130b of FIG. 2 described above, and the ADC circuit 140a' may be the same as the ADC circuit 140a of FIG. 2 described above. Descriptions that are previously given are omitted.

The multiplexer 600 may connect column line groups connected to the pixel array 110a' to comparator groups, and may change a connection relationship between the column line groups and the comparator groups according to a mode change signal. In an embodiment, in a first mode, the multiplexer 600 receives a first mode signal MS1, connects the first column line group CL1 connected to the first pixel group PX1 of the pixel array 110a' to the first comparator group 141a' receiving the ramp voltage Vramp1 generated by the first ramp signal generator 130a', and may connect the second column line group CL2 connected to the second pixel group PX2 of the pixel array 110a' to a second comparator group 141b' receiving the ramp voltage Vramp2 generated by the second ramp signal generator 130b'. For example, the first comparator group 141a' may be connected to the (4n+1)-th column line and the (4n+2)-th column line, and the second comparator group 141b' may be connected to the (4n+3)-th column line and the (4n+4)-th column line. At this time, the ramp voltage Vramp1 generated by the first ramp signal generator 130a' may have the same slope as that of the ramp voltage Vramp2 generated by the second ramp signal generator 130b' and time points thereof at which levels thereof change to have a slope may be different from each other. Accordingly, a time point at which the first comparator group 141a' compares the first pixel signal received from the first column line group CL1 with the ramp voltage Vramp1 may be different from a time point at which the second comparator group 141b' compares the second pixel signal received from the second column line group 141b' with the ramp voltage Vramp2. An operation in the first mode is described below with reference to FIGS. 9A and 9B.

In an embodiment, the multiplexer 600 receives a second mode signal MS2 in the second mode, and the image sensor 200a reads one row line of the pixel array 110a' during a first period and a second period. For example, during the first period, the multiplexer 600 may connect some of the column lines of the first column line group CL1 to the first comparator group 141a' and the second comparator group 141b' and may connect some of the column lines of the second column line group CL2 to the first comparator group 141a' and the second comparator group 141b'. For example, some of the column lines of the first column line group CL1 may be the (4n+1)-th column line, and some of the column lines of the second column line group CL2 may be the (4n+3)-th column line.

After the first period, the multiplexer 600 may connect the other column lines of the first column line group CL1 to the first comparator group 141a' and the second comparator group 141b' and connect the other column lines of the second column line group CL2 to the first comparator group 141a' and the second comparator group 141b'. For example, the other column lines of the first column line group CL1 may be the (4n+2)-th column line, and the other column lines of the second column line group CL2 may be the (4n+4)-th column line. The ramp voltage Vramp1 generated by the first ramp signal generator 130a' may have a slope different from that of the ramp voltage Vramp2 generated by the second ramp signal generator 130b'. An operation in the second mode is described below with reference to FIGS. 9A and 9C.

Figure 9A:
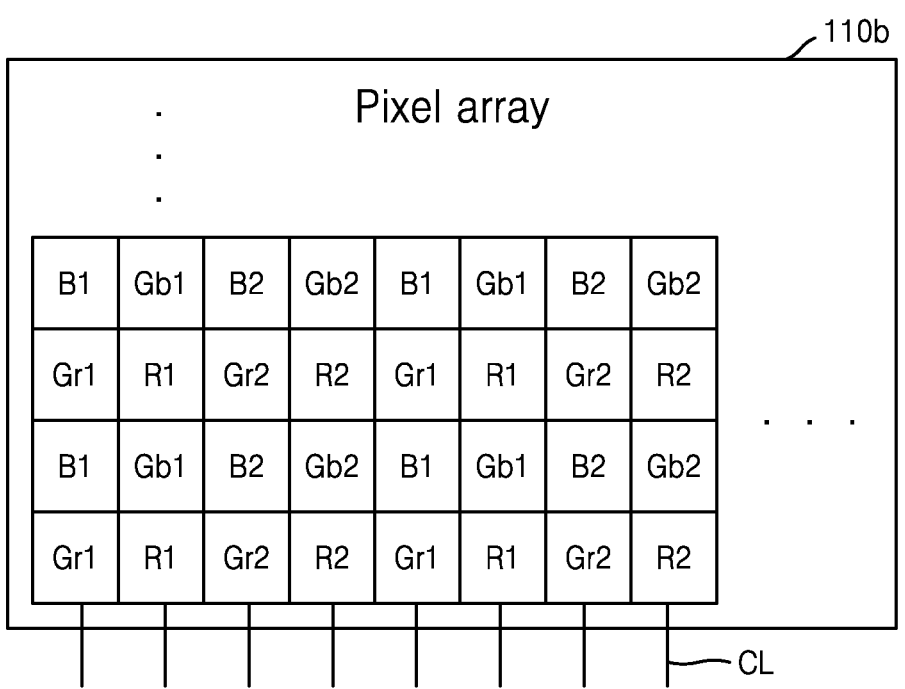
FIG. 9A is a block diagram illustrating an implementation of a pixel array according to an embodiment.

FIG. 9A is a block diagram illustrating an implementation example of a pixel array 110b according to an embodiment, and FIGS. 9B and 9C are tables illustrating operations according to modes of an image sensor according to an embodiment. In some embodiments, the pixel array 110b of FIG. 9A may be an example of the pixel array 110a' of FIG. 8, FIG. 9B shows an example illustrating a first mode operation of the image sensor 200a of FIG. 8 according to the first mode signal MS1, and FIG. 9C may be an example illustrating a second mode operation of the image sensor 200a of FIG. 8 according to the second mode signal MS2.

In some embodiments, referring to FIGS. 3 and 9A, the pixel array 110b may include the pixel group PGa of FIG. 3, and the pixel group of the same color may be divided into two groups. For example, the first green pixels Gr may be divided into Gr1 pixels and Gr2 pixels, red pixels R may be divided into R1 pixels and R2 pixels, blue pixels B may be divided into B1 pixels and B2 pixels, and the second green pixels Gb may be divided into Gb1 pixels and Gb2 pixels.

The Gr1, R1, Gr2, and R2 pixels may be sequentially arranged on one row line, and B1, Gb1, B2, and Gb2 pixels may be sequentially arranged on another row line.

In some embodiments, referring to FIGS. 8, 9A, and 9B, when the multiplexer 600 receives the first mode signal MS1, the multiplexer 600 may connect the column line CL connected to the Gr1 pixel, the R1 pixel, the B1 pixel, and the Gb1 pixel to the first comparator group 141a' receiving the ramp voltage Vramp1 generated by the first ramp signal generator 130a' and may connect the column line CL connected to the Gr2 pixel, the R2 pixel, the B2 pixel, and the Gb2 pixel to the second comparator group 141b' receiving the ramp voltage Vramp2 generated by the second ramp signal generator 130b'. The ramp voltage Vramp1 generated by the first ramp signal generator 130a' and the ramp voltage Vramp2 generated by the second ramp signal generator 130b' may have the same slope, and time points at which the levels change to have the slope may be different. Therefore, a time point at which the first comparator group 141a' compares a pixel signal of the Gr1 pixel with the ramp voltage Vramp1 may be different from a time point at which the second comparator group 141b' compares a pixel signal of the Gr2 pixel with the ramp voltage Vramp2, a time point at which the first comparator group 141a' compares a pixel signal of the R1 pixel with the ramp voltage Vramp1 may be different from a time point at which the second comparator group 141b' compares a pixel signal of the R2 pixel with the ramp voltage Vramp2, a time point at which the first comparator group 141a' compares a pixel signal of the B1 pixel with the ramp voltage Vramp1 may be different from a time point at which the second comparator group 141b' compares a pixel signal of the pixel B2 with the ramp voltage Vramp2, and a time point at which the first comparator group 141a' compares a pixel signal of the Gb1 pixel with the ramp voltage Vramp1 may be different from a time point at which the second comparator group 141b' compares a pixel signal of the Gb2 pixel with the ramp voltage Vramp2, so that introduction of the same noise may be prevented and pieces of noise may be canceled out with each other, thereby reducing noise to increase the performance of the image sensor.

In some embodiments, referring to FIGS. 8, 9A, and 9C, when the multiplexer 600 receives the second mode signal MS2, the multiplexer 600 may connect the column line CL connected to the Gr1 pixel to the first comparator group 141a' and the second comparator group 141b' and may connect the column line CL connected to the Gr2 pixel to the first comparator group 141a' and the second comparator group 141b' during a first period 1 h-time. During a second period 2 h-time, the multiplexer 600 may connect the column line CL connected to the R1 pixel to the first comparator group 141a' and the second comparator group 141b' and may connect the column line CL connected to the R2 pixel to the first comparator group 141a' and the second comparator group 141b'. During a third period 3 h-time, the multiplexer 600 may connect the column line CL connected to the B1 pixel to the first comparator group 141a' and the second comparator group 141b' and may connect the column line CL connected to the B2 pixel to the first comparator group 141a' and the second comparator group 141b'. During a fourth period 4 h-time, the multiplexer 600 may connect the column line CL connected to the Gb1 pixel to the first comparator group 141a' and the second comparator group 141b' and may connect the column line CL connected to the Gb2 pixel to the first comparator group 141a' and the second comparator group 141b'. The first ramp voltage Vramp1 generated by the first ramp signal generator 130a' may have a slope different from that of the second ramp voltage Vramp2 generated by the second ramp signal generator 130*b'*. Therefore, for a pixel signal of one of the Gr1 pixels, Gr2 pixels, R1 pixels, R2 pixels, B1 pixels, B2 pixels, Gb1 pixels, and Gb2 pixels, two comparison signal values (a comparison signal value compared with the first ramp voltage Vramp1 and a comparison signal value compared with the second ramp voltage Vramp2) may be generated, and one of the two comparison signal values may be used in a dark screen and the other signal value among the two comparison signal values may be used in a bright screen, and thus, a dynamic range (DR) may increase. For example, the slope of the first ramp voltage Vramp1 may be smaller than the slope of the second ramp voltage Vramp2, in a dark screen, the comparison signal value compared with the first ramp voltage Vramp1 may be used, and in a bright screen, a comparison signal value compared with the second ramp voltage Vramp2 may be used.

Figure 10:
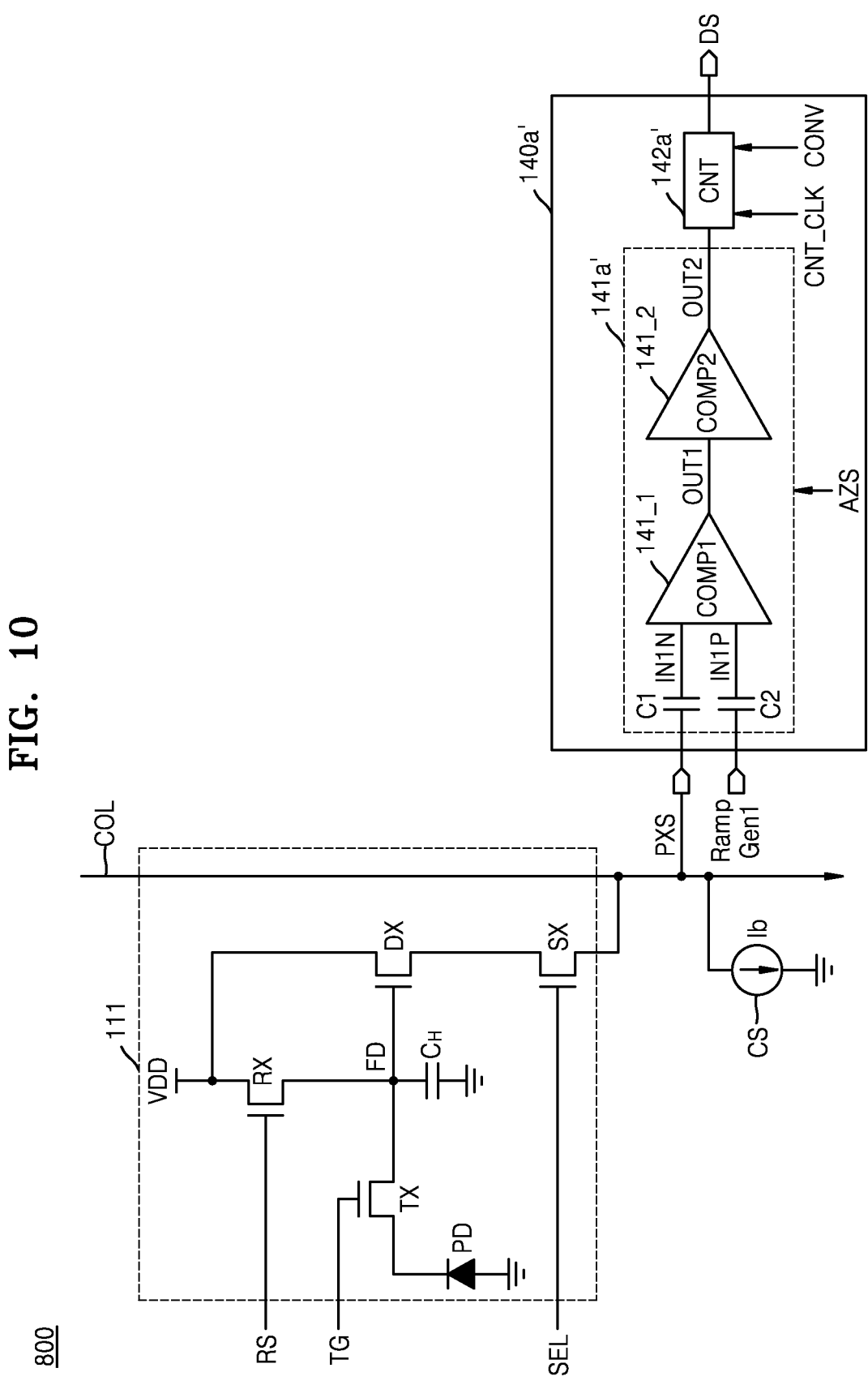
FIG. 10 is a block diagram illustrating a portion of an image sensor according to an embodiment.

FIG. 10 is a block diagram illustrating a portion of an image sensor 800 according to an embodiment. In some embodiments, the image sensor 800 of FIG. 10 may be an example of the image sensor 200 of FIG. 2. The image sensor 800 may include a pixel 111 and an ADC circuit 140*a'*.

The pixel 111 may be one of the pixels PX included in the pixel array 110*a* of FIG. 2, and may include a photodiode PD and a plurality of transistors, e.g., a transfer transistor TX, a reset transistor RX, a driving transistor DX, and a selection transistor SX. The photodiode PD may convert light incident from the outside into an electrical signal. The photodiode PD generates a charge according to light intensity. The reset transistor RX may be turned on in response to a reset control signal RS applied to a gate terminal thereof to reset a floating diffusion node FD based on a pixel power voltage VDD. The transfer transistor TX may be turned on in response to a transfer control signal TG applied to the gate terminal thereof to transmit a charge generated by the photodiode PD to the floating diffusion node FD. Charges may be accumulated in the floating diffusion node FD. Charges accumulated in the floating diffusion node FD may generate a voltage. The driving transistor DX may operate as a source follower based on a bias current Ib generated by a current source CS connected to the column line CL, and output a voltage corresponding to a voltage of the floating diffusion node FD, as a pixel voltage PXS through the selection transistor SX. The selection transistor SX may select the pixel PX. The selection transistor SX may be turned on in response to a selection signal SEL applied to the gate terminal and output the pixel voltage PXS (or current) output from the driving transistor DX to a column line COL. The pixel voltage PXS may be provided to the ADC circuit 140*a'* through the column line COL.

The ADC circuit 140*a'* may include a comparator 141*a'* and a counter circuit 142*a'*. The comparator 141*a'* may be one of the first comparator group 141*a* and the second comparator group 141*b* of FIG. 2, and is described below as the first comparator group 141*a*, but embodiments are not limited thereto. The comparator 141*a'* may include a first amplifier 141_1 COMP1 and a second amplifier 141_2 COMP2. The comparator 141*a'* may be initialized in response to an auto-zero signal in an auto-zero period before performing a comparison operation, and may control a bias current or voltage in response to switch control signals while performing a comparison operation.

The first amplifier 141_1 COMP1 may be implemented to compare a pixel voltage PXS output through the column line COL received through an input capacitor C1 to a ramp signal Ramp Gen1 generated by the first ramp signal generator 130*a* received through an input capacitor C2 and output a comparison result. The first amplifier 141_1 COMP1 may further include switches, and may remove an offset of the first amplifier 141_1 COMP1 in response to a switch control signal.

The second amplifier 141_2 COMP2 may be implemented to amplify an output OUT1 of the first amplifier 141_1 COMP1. For example, the second amplifier 141_2 COMP2 may include a differential amplifier, and an output OUT2 of the second amplifier 141_2 COMP2 may be provided to the counter circuit 142*a'* as a comparison result signal. The second amplifier 141_2 COMP2 may further include switches, and may remove an offset of the second amplifier 141_2 COMP2 in response to a switch control signal.

The counter circuit 142*a'* may be the same as the counter circuit 142*a* of FIG. 2 and may be implemented to count the comparison result signal OUT2 based on a counting clock signal CNT_CLK and an inverted signal CONV to generate and output a counted digital signal DS. The digital signal DS may have an image component from which a reset component is removed from the pixel voltage PXS, that is, a digital value corresponding to the image signal.

Figure 11A:
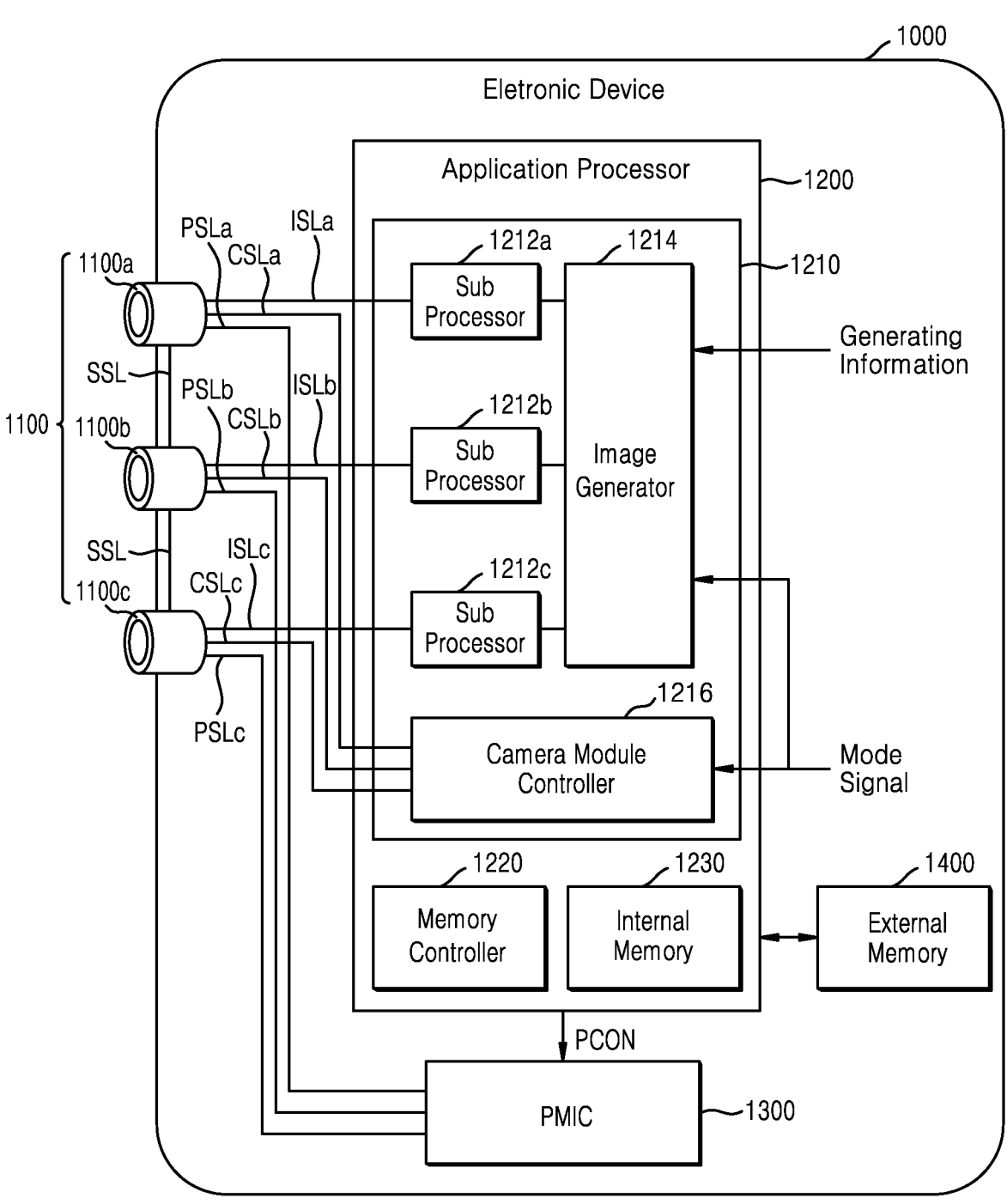
FIGS. 11A and 11B are block diagrams of an electronic device including a multi-camera module.
Figure 11B:
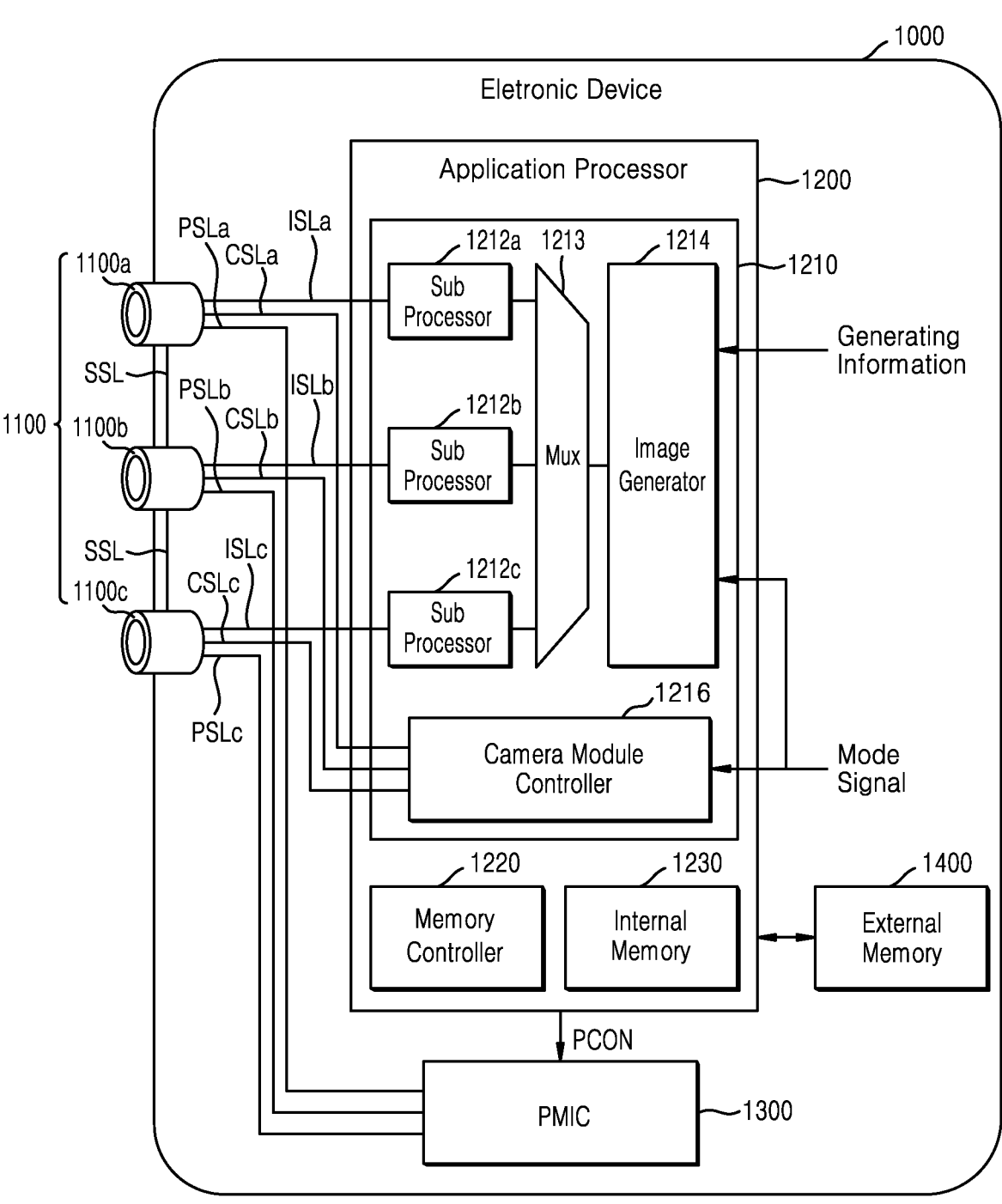
Figure 12:
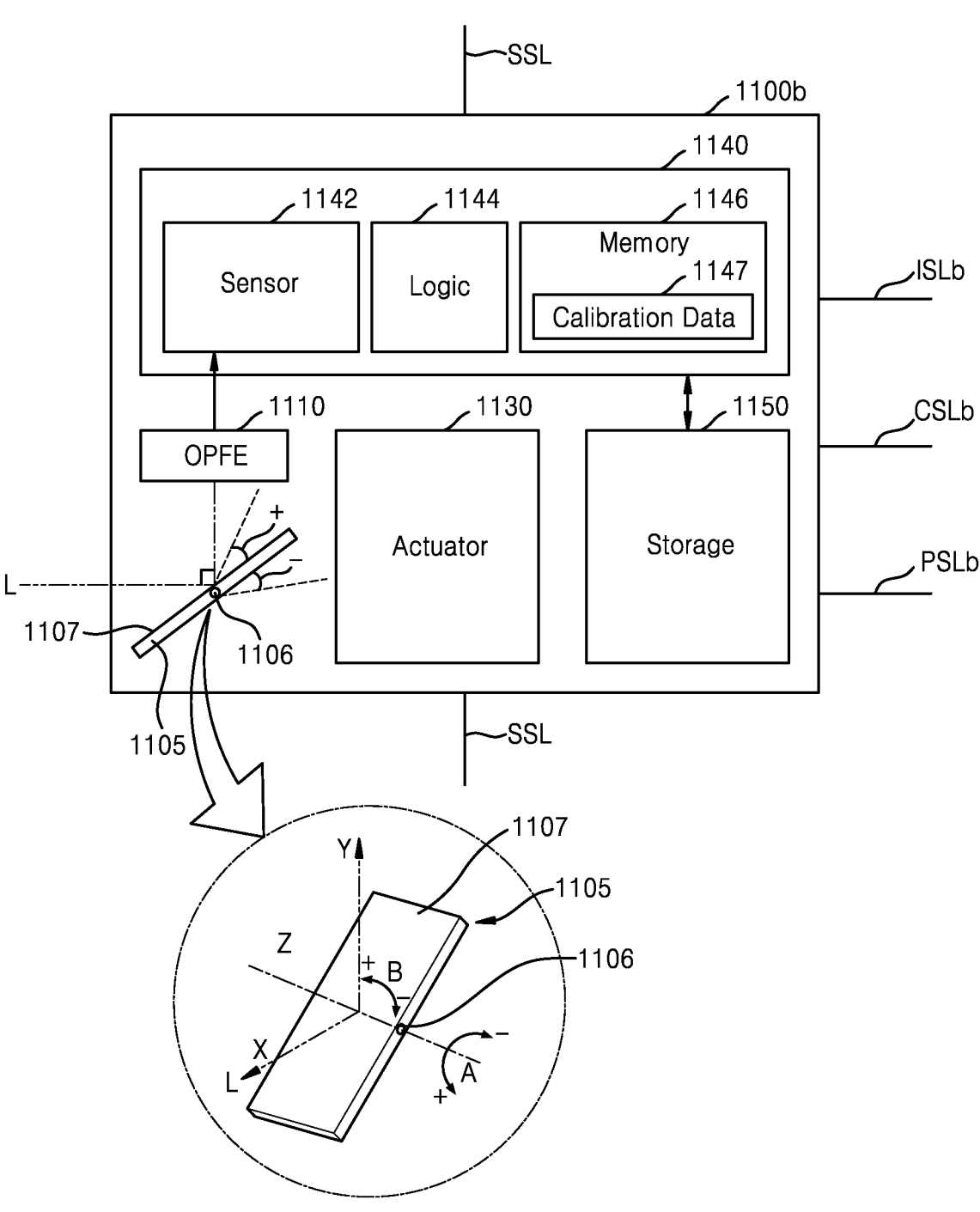
FIG. 12 is a detailed block diagram of the multi-camera module of FIGS. 11A and 11B.

FIGS. 11A and 11B are block diagrams of an electronic device 1000 including a multi-camera module. FIG. 12 is a detailed block diagram of a camera module 1100*b* of FIGS. 11A and 11B.

Referring to FIG. 11A, the electronic device 1000 may include a camera module group 1100, an application processor (AP) 1200, a power management integrated circuit (PMIC) 1300, and an external memory 1400.

The camera module group 1100 may include a plurality of camera modules 1100*a*, 1100*b*, and 1100*c*. Although an embodiment in which three camera modules 1100*a*, 1100*b*, and 1100*c* are arranged is illustrated, embodiments are not limited thereto. In some embodiments, the camera module group 1100 may include only two camera modules or may be modified to include n (n is a natural number of 4 or greater) camera modules.

Hereinafter, a detailed configuration of the camera module 1100*b* is described in detail with reference to FIG. 12, but the following description may be equally applied to the other camera modules 1100*a* and 1100*c* according to embodiments.

Referring to FIG. 12, the camera module 1100*b* may include a prism 1105, an optical path folding element (OPFE) 1110, an actuator 1130, an image sensing device 1140, and storage 1150.

The prism 1105 may include a reflective surface 1107 of a light reflective material to change a path of light L incident from the outside.

In some embodiments, the prism 1105 may change the path of light L incident in a first direction X to a second direction Y perpendicular to the first direction X. In addition, the prism 1105 may rotate the reflective surface 1107 of the light reflective material in an A direction based on a central axis 1106 or rotate the central axis 1106 in a B direction to change the path of light L incident in the first direction X to the second direction Y perpendicular thereto. Here, the OPFE 1110 may also move in a third direction Z perpendicular to the first direction X and the second direction Y.

In some embodiments, as shown, a maximum angle of rotation of the prism 1105 in the A direction may be less than 15 degrees in a plus (+) A direction and greater than 15 degrees in a minus A direction, but the embodiments are not limited thereto.

In some embodiments, the prism 1105 may move the reflective surface 1107 of the light reflective material in a third direction (e.g., a Z direction) parallel to an extension direction of the central axis 1106.

In some embodiments, the camera module 1100b may include two or more prisms, through which the path of the light L incident in the first direction X may change to the second direction perpendicular to the first direction X, to the first direction X or the third direction Z again, and to the second direction Y again.

The OPFE 1110 may include, for example, optical lenses including m (here, m is a natural number) groups. The m lenses may move in the second direction Y to change an optical zoom ratio of the camera module 1100b. For example, when a basic optical zoom ratio of the camera module 1100b is Z and m optical lenses included in the OPFE 1110 are moved, the optical zoom ratio of the camera module 1100b may change to an optical zoom ratio of 3Z or 5Z or to an optical zoom ratio of 5Z or higher.

The actuator 1130 may move the OPFE 1110 or an optical lens (hereinafter referred to as an optical lens) to a certain position. For example, the actuator 1130 may adjust a position of the optical lens so that an image sensor (or a sensor) 1142 is located at a focal length of the optical lens for accurate sensing.

The image sensing device 1140 may include the image sensor 1142, a control logic (or a logic) 1144, and a memory 1146. The image sensor 1142 may sense an image of a sensing target using light L provided through the optical lens. In some embodiments, the image sensor 1142 may include two ramp signal generators (e.g., the first ramp signal generator 130a and the second ramp signal generator 130b in FIG. 2), two comparator groups (e.g., the first comparator group 141a and the second comparator group 141b in FIG. 2), and a pixel array including a pixel group in which pixel groups of the same color are divided into two groups (e.g., the pixel array 110a in FIG. 2). Each of the ramp signals generated by the two ramp signal generators may have the same slope, and time points at which the levels change to have the slopes may be different from each other. Accordingly, the two comparator groups compare the pixel signals of the pixel groups divided into two groups at different time points to prevent the same noise from being introduced and to cancel out pieces of noise with each other to reduce noise.

The control logic 1144 may control the overall operation of the camera module 1100b and process a sensed image. For example, the control logic 1144 may control the operation of the camera module 1100b according to a control signal provided through the control signal line CSLb, and extract image data corresponding to a certain image (e.g., a person's face, arms, legs, etc.) from the sensed image.

In some embodiments, the control logic 1144 may perform image processing, such as encoding and noise reduction of the sensed image. As an embodiment, the control logic 1144 may receive compressed configuration data through the control signal line CSLb and decompress the received compressed configuration data.

The memory 1146 may store information required for operation of the camera module 1100b, such as configuration data or calibration data 1147. The memory 1146 may store the compressed configuration data and decompressed configuration data. The configuration data may include sensor calibration information including crosstalk (XTK) and lens shading correction (LSC), FW TnP, sensor exposure time, gain, and the like. The calibration data 1147 is information used to calibrate the camera module 1100b to generate image data using the light L provided from the outside. The calibration data 1147 may include, for example, information on the degree of rotation, information on a focal length, information on an optical axis, and the like. When the camera module 1100b is implemented in the form of a multi-state camera in which the focal length changes according to the position of the optical lens, the calibration data 1147 may include a focal length value for each position (or state) of the optical lens and information related to auto-focusing.

The storage 1150 may store image data sensed through the image sensor 1142. The storage 1150 may be located outside the image sensing device 1140 and may be implemented in a stacked form with a sensor chip constituting the image sensing device 1140. In some embodiments, the image sensor 1142 may be configured as a first chip, and the control logic 1144, the storage 1150, and the memory 1146 may be configured as a second chip, so that the two chips may be implemented in a stacked form.

In some embodiments, the storage 1150 may be implemented as electrically erasable programmable read-only memory (EEPROM), but embodiments are not limited thereto. In some embodiments, the image sensor 1142 includes a pixel array, and the control logic 1144 may include an ADC and an image signal processor processing the sensed image.

Referring to FIGS. 11A and 12 together, in some embodiments, each of the camera modules 1100a, 1100b, and 1100c may include an actuator 1130. Accordingly, each of the camera modules 1100a, 1100b, and 1100c may include the same or different calibration data 1147 according to the operation of the actuator 1130 included therein.

In some embodiments, one camera module (e.g., 1100b), among the camera modules 1100a, 1100b, and 1100c, is a folded lens-type camera module including the prism 1105 and the OPFE 1110 described above. camera module, and the other camera modules (e.g., 1100a and 1100c) may be vertical camera modules that do not include the prism 1105 and the OPFE 1110, but are not limited thereto.

In some embodiments, one camera module (e.g., 1100c), among the camera modules 1100a, 1100b, and 1100c, may be a vertical-type depth camera extracting depth information using infrared rays (IR), for example. In this case, the AP 1200 may generate a 3D depth image by merging image data provided from the depth camera and image data provided from another camera module (e.g., 1100a or 1100b).

In some embodiments, each of the camera modules 1100a, 1100b, and 1100c may be located to be physically separated from another. That is, the camera modules 1100a, 1100b, and 1100c may not use a divided portion of a sensing region of the single image sensor 1142, but the independent image sensor 1142 may be located in each of the camera modules 1100a, 1100b, and 1100c.

Referring back to FIG. 11A, the AP 1200 may include an image processing device 1210, a memory controller 1220, and an internal memory 1230. The AP 1200 may be implemented as a semiconductor chip separately from the camera modules 1100a, 1100b, and 1100c, for example.

The image processing device 1210 may include a plurality of sub-image processors (or sub-processors) 1212a, 1212b, and 1212c, an image generator 1214, and a camera module controller 1216.

The image processing device 1210 may include a plurality of sub-image processors 1212a, 1212b, and 1212c corresponding to the number of camera modules 1100a, 1100b, and 1100c.

Image data generated by the camera module 1100a may be provided to the sub-image processor 1212a through an image signal line ISLa, image data generated by the camera module 1100b may be provided to the sub-image processor 1212b through an image signal line ISLb, and image data generated by the camera module 1100c may be provided to the sub-image processor 1212c through an image signal line ISLc. Such image data transmission may be performed using, for example, a camera serial interface (CSI) based on mobile industry processor interface (MIPI), but is not limited thereto.

Meanwhile, in some embodiments, one sub-image processor may be arranged to correspond to a plurality of camera modules. For example, the sub-image processor 1212a and the sub-image processor 1212c may not be separately implemented as shown, but may be integrated into one sub-image processor, and image data provided from the camera module 1100a and the camera module 1100c may be selected through a selection element (e.g., a multiplexer) and the like, and then provided to the integrated sub-image processor. In this case, the sub-image processor 1212b may not be integrated and may receive image data from the camera module 1100b.

Also, in some embodiments, image data generated by the camera module 1100a may be provided to the sub-image processor 1212a through the image signal line ISLa, image data generated by the camera module 1100b may be provided to the sub-image processor 1212b through the image signal line ISLb, and image data generated by the camera module 1100c may be provided to the sub-image processor 1212c through the image signal line ISLc. Also, the image data processed by the sub-image processor 1212b may be directly provided to the image generator 1214, while one of the image data processed by the sub-image processor 1212a and the image data processed by the sub-image processor 1212c may be selected by a selection element (e.g., a multiplexer) and then provided to the image generator 1214.

The image data processed by each of the sub-image processors 1212a, 1212b, and 1212c may be provided to the image generator 1214. The image generator 1214 may generate an output image using image data provided from each of the sub-image processors 1212a, 1212b, and 1212c according to image generating information or a mode signal.

Referring to FIG. 11B, in some embodiments, the image processing device 1210 may further include a selection unit (or a Mux) 1213 selecting outputs from the sub-image processors 1212a, 1212b, and 1212c and transferring the selected output to the image generator 1214.

In this case, the selection unit 1213 may perform different operations according to a zoom signal or zoom factor. For example, when the zoom signal is a fourth signal (e.g., a zoom magnification is a first magnification), the selection unit 1213 may select one of the outputs from the sub-image processors 1212a, 1212b, and 1212c and transfer the selected output to the image generator 1214.

Also, when the zoom signal is a fifth signal (e.g., the zoom factor is a second factor) different from the fourth signal, the selection unit 1213 may sequentially transfer p outputs, among the outputs from the sub-image processors 1212a, 1212b, and 1212c, to the image generator 1214. For example, the selection unit 1213 may sequentially transfer the outputs from the sub-image processor 1212b and the sub-image processor 1212c to the image generator 1214. Also, the selection unit 1213 may sequentially transfer the outputs from the sub-image processor 1212a and the sub-image processor 1212b to the image generator 1214. The image generator 1214 may generate an output image by merging the p outputs that are sequentially provided.

Here, image processing, such as demosaic, down scaling to a video/preview resolution size, gamma correction, and high dynamic range (HDR) processing, may be performed in advance by the sub-image processors 1212a, 1212b, and 1212c, and resultant image data may be transferred to the image generator 1214. Therefore, even if the resultant image data is provided to the image generator 1214 to one signal line through the selection unit 1213, the image merging operation of the image generator 1214 may be performed at a high speed.

In some embodiments, the image generator 1214 may receive a plurality of pieces of image data having different exposure times from at least one of the sub-image processors 1212a, 1212b, and 1212c, and perform an HDR operation on the image data, thereby generating merged image data with increased dynamic range.

The camera module controller 1216 may provide control signals respectively to the camera modules 1100a, 1100b, and 1100c. The control signals generated by the camera module controller 1216 may be provided to corresponding camera modules 1100a, 1100b, and 1100c through separate control signal lines CSLa, CSLb, and CSLc, respectively.

The AP 1200 may store the received image signal, that is, an encoded image signal, in the internal memory 1230 or the external memory 1400 of the AP 1200, and thereafter, the AP 1200 may read the encoded image signal from the internal memory 1230 or the external memory 1400, decode the read image signal, and display image data generated based on the decoded image signal. For example, a corresponding sub-image processor, among the sub-image processors 1212a, 1212b, and 1212c, of the image processing device 1210 may perform decoding and may also perform image processing on the decoded image signal.

The PMIC 1300 may supply power, for example, a power supply voltage, to each of the camera modules 1100a, 1100b, and 1100c. For example, the PMIC 1300 may supply first power to the camera module 1100a through a power signal line PSLa, supply second power to the camera module 1100b through a power signal line PSLb, and supply third power to the camera module 1100c through a power signal line PSLc.

While the inventive concept has been particularly shown and described with reference to embodiments thereof, it will be understood that various changes in form and details may be made therein without departing from the spirit and scope of the following claims.

What is claimed is:

1. An image sensor comprising:
   a pixel array connected to a plurality of column lines;
   a first ramp signal generator generating a first ramp signal;
   a second ramp signal generator generating a second ramp signal; and
   an analog-to-digital conversion (ADC) circuit operating in a first mode,
   wherein the ADC circuit comprises:
   a first comparator group comparing the first ramp signal with a first pixel signal received from a first column line group, among the plurality of column lines; and
   a second comparator group comparing the second ramp signal with a second pixel signal received from a second column line group, among the plurality of column lines,
   wherein the first pixel signal includes a first reset signal and a first image signal,
   the second pixel signal includes a second reset signal and a second image signal, the first comparator group compares the first reset signal with the first ramp signal at a first time point and compares the first image signal with the first ramp signal at a second time point, the second comparator group compares the second reset signal with the second ramp signal at a third time point and compares the second image signal with the second ramp signal at a fourth time point, wherein the first time point is earlier than the third time point, and the second time point is earlier than the fourth time point, and wherein the first pixel signal and the second pixel signal are generated by different pixels.

2. The image sensor of claim 1, further comprising:

a multiplexer connecting the first column line group and the second column line group to the first comparator group and the second comparator group, wherein the multiplexer operates in the first mode or a second mode according to a mode change signal.

3. The image sensor of claim 2, wherein, in the first mode, a slope of the first ramp signal is the same as a slope of the second ramp signal, and the multiplexer connects the first column line group to the first comparator group, and connects the second column line group to the second comparator group.

4. The image sensor of claim 3, wherein the first column line group includes a (4n+1)-th column line and a (4n+2)-th column line, among the plurality of column lines, and the second column line group includes a (4n+3)-th column line and a (4n+4)-th column line, among the plurality of column lines, where n is an integer greater than or equal to 0.

5. The image sensor of claim 2, wherein, in the second mode, a slope of the first ramp signal is different from a slope of the second ramp signal, the first column line group includes a first sub-group and a second sub-group, the second column line group includes a third sub-group and a fourth sub-group, and during a first period, the multiplexer connects the first sub-group to the first comparator group and the second comparator group and connects the third sub-group to the first comparator group and the second comparator group, and during a second period, the multiplexer connects the second sub-group to the first comparator group and the second comparator group and connects the fourth sub-group to the first comparator group and the second comparator group.

6. The image sensor of claim 5, wherein the first sub-group includes a (4n+1)-th column line, among the plurality of column lines, the second sub-group includes a (4n+2)-th column line, among the plurality of column lines;

the third sub-group includes a (4n+3)-th column line, among the plurality of column lines, and the fourth sub-group includes a (4n+4)-th column line, among the plurality of column lines, where n is an integer greater than or equal to 0.

7. The image sensor of claim 1, wherein the pixel array includes a plurality of pixels connected to the plurality of column lines, the plurality of pixels include first green pixels, red pixels, second green pixels, and blue pixels arranged in two rows and two columns.

8. An image sensor comprising:

a pixel array including a plurality of pixels, wherein the pixel array is connected to a plurality of column lines outputting a plurality of pixel signals generated by the plurality of pixels;

a first ramp signal generator generating a first ramp signal;

a second ramp signal generator generating a second ramp signal;

an analog-to-digital conversion (ADC) circuit analog-to-digital converting the plurality of pixel signals and operating in a first mode; and a timing controller controlling timings of the first ramp signal generator and the second ramp signal generator, wherein the ADC circuit comprises a first correlated double sampling (CDS) circuit reading the plurality of pixel signals based on the first ramp signal and a second CDS circuit reading the plurality of pixel signals based on the second ramp signal in the first mode, the plurality of pixel signals include a plurality of first pixel signals and a plurality of second pixel signals, the plurality of column lines include a plurality of first column lines and a plurality of second column lines, wherein the first CDS circuit reads the plurality of first pixel signals at a timing different from a timing at which the second CDS circuit reads the plurality of second pixel signals, wherein the plurality of first pixel signals and the plurality of second pixel signals are generated by different pixels, and wherein the first CDS circuit receives the plurality of first pixel signals through the plurality of first column lines, the second CDS circuit receives the plurality of second pixel signals through the plurality of second column lines, some of the pixels, which sense light of a same color and are connected to a same row line, are connected to a corresponding first column line, among the plurality of first column lines, and others are connected to a corresponding second column line, among the plurality of second column lines.

9. The image sensor of claim 8, wherein the plurality of pixels include first green pixels, red pixels, second green pixels, and blue pixels arranged in two rows and two columns.

10. The image sensor of claim 8, wherein the plurality of pixels correspond to the same color and include four pixels arranged in two rows and two columns.

11. The image sensor of claim 8, wherein the plurality of pixels comprise:

a first red pixel and a second red pixel connected to a same row line for sensing light of a red color;

a first green pixel and a second green pixel connected to a same row line for sensing light of a green color; and a first blue pixel and a second blue pixel connected to a same row line and for sensing light of a blue color, wherein each of the first red pixel, the first green pixel, and the first blue pixel is connected to the first CDS circuit through a corresponding column line, among the plurality of first column lines, and wherein each of the second red pixel, the second green pixel, and the second blue pixel is connected to the second CDS circuit through a corresponding column line, among the plurality of second column lines.

12. The image sensor of claim 8, wherein each of the plurality of first pixel signals includes a first reset signal and a first image signal, each of the plurality of second pixel signals includes a second reset signal and a second image signal, the first CDS circuit compares the first reset signal with the first ramp signal at a first time point and compares the first image signal with the first ramp signal at a second time point;

the second CDS circuit compares the second reset signal with the second ramp signal at a third time point and compares the second image signal with the second ramp signal at a fourth time point, the first time point is different from the third time point, and the second time point is different from the fourth time point.

13. The image sensor of claim 12, wherein the first time point is earlier than the third time point, and the second time point is earlier than the fourth time point.

14. The image sensor of claim 12, wherein the first time point is earlier than the third time point, and the second time point is later than the fourth time point.

15. The image sensor of claim 8, further comprising:

a multiplexer connecting the plurality of first column lines and the plurality of second column lines to the first CDS circuit and the second CDS circuit, wherein the multiplexer further comprises a multiplexer switchable to the first mode or a second mode according to a mode change signal.

16. An image sensor comprising:

a first ramp signal generator generating a first ramp signal;

a second ramp signal generator generating a second ramp signal;

a pixel array including first color pixels connected to a first column line and a second column line and second color pixels connected to a third column line and a fourth column line; and an analog-to-digital conversion (ADC) circuit, wherein the ADC circuit includes:

a first comparator comparing a first pixel signal received from the first column line and the third column line with the first ramp signal;

a second comparator comparing a second pixel signal received from the second column line and the fourth column line with the second ramp signal, and wherein the comparing of the first pixel signal occurs at a comparison time point different from a comparison time point during which the comparing of the second pixel signal occurs, and wherein the first pixel signal and the second pixel signal are generated by different pixels.

* * * * *